United States Patent [19]

Ball et al.

[11] Patent Number: 5,011,668

[45] Date of Patent: Apr. 30, 1991

[54] CALCINATION APPARATUS

[75] Inventors: David J. Ball; Edward Varney, both of Nottingham, Great Britain

[73] Assignee: United States Gypsum Company, Chicago, Ill.

[21] Appl. No.: 318,498

[22] Filed: Mar. 2, 1989

Related U.S. Application Data

[63] Continuation of Ser. No. 144,693, Jan. 13, 1988, abandoned, which is a continuation of Ser. No. 507, Jan. 5, 1987, abandoned.

[30] Foreign Application Priority Data

Jan. 7, 1986 [GB] United Kingdom ................ 8600275

[51] Int. Cl.$^5$ ...................... F27B 15/00; C04B 11/00; C04B 11/02
[52] U.S. Cl. .................................. 423/171; 423/170; 423/172; 423/555
[58] Field of Search ................ 423/170, 171, 172, 555

[56] References Cited

U.S. PATENT DOCUMENTS

| | | | |
|---|---|---|---|
| 2,647,738 | 8/1953 | Trainer | 432/58 |
| 3,542,347 | 11/1970 | Goldney et al. | 432/15 |
| 4,238,238 | 12/1980 | Kinkade et al. | 423/171 |
| 4,455,285 | 6/1984 | Watkins et al. | 423/171 |
| 4,626,199 | 12/1986 | Bounini | 432/58 |
| 4,629,419 | 12/1986 | Ward et al. | 432/13 |

FOREIGN PATENT DOCUMENTS 2043219 10/1980 United Kingdom ................ 423/172

Primary Examiner—Asok Pal
Attorney, Agent, or Firm—Robert H. Robinson; John M. Lorenzen

[57] ABSTRACT

In a method and apparatus for calcining calcium sulphate dihydrate or like heat sensitive material, in which a bed of the material is heated in a vessel (41) by the direct introduction of a hot gas through a tube (21) extending downwardly into the bed, the proportion of insoluble anhydrite (II) in the product is reduced by lowering the temperature of the hot gas before it contacts the material of the bed. This is done by indirect heat exchange through the wall of the tube 21 with a relatively cool substance, for example, powdered gypsum or recycled exhaust gases, in an outer tube (26). The cooling material in the outer tube contacts the material in the bed before the latter is contacted by the hot gas.

7 Claims, 2 Drawing Sheets

CALCINATION APPARATUS

This is a continuation of co-pending application Ser. No. 144,693 filed on Jan. 13, 1988 which is a continuation of application Ser. No. 07/000,507 filed Jan. 5, 1987, now both abandoned.

The present invention relates to calcination apparatus, and more especially to apparatus for calcining calcium sulphate dihydrate or gypsum.

One of the main methods by which gypsum has been calcined industrially is by indirect or external heating of a bed of gypsum of substantial depth in a so-called "kettle". Such kettles may be operated batchwise or by a continuous process as described in GB 1 018 464. More recently, the heat input to kettles has been increased, and the production rate thereby enhanced, by the direct introduction of hot gas into the bed through a tube extending downwardly from the top of the vessel and provided with at least one opening in its lower region, as described in GB 1 488 665. Furthermore, GB 2 043 219 describes a calcination vessel of different form, having inclined side walls to provide a smaller cross sectional area at the bottom of the vessel than at the top of the bed, a downwardly extending heating tube opening in the interior of the vessel adjacent to the bottom for the passage of hot gas into the bed.

It has been found that calcination techniques using direct heating by the introduction of hot gas tend to produce a proportion of insoluble anhydrite (anhydrite II) which is detrimental in the manufacture of plasterboard. We now believe that an important factor in the production of insoluble anhydrite is the temperature of the hot gas when it first contacts gypsum in the bed.

It is an object of the present invention to reduce the proportion of insoluble anhydrite produced by a calcination process involving the direct introduction of hot gases into a bed of gypsum and we achieve this by reducing the temperature of the hot gas contacting the gypsum.

According to the present invention, the downwardly extending hot gas tube in calcination apparatus of the type described above is surrounded along part only of its length by an outer tube which extends from a level above that of the bed, when the apparatus is in operation, to a level below that of the bed, and means are provided for introducing at least one cool substance compatible with the material of the bed into an upper region of the outer tube, whereby the substance is separate from the material of the bed and reduces the temperature of the hot gas by heat exchange through the hot gas tube before emerging from the lower end of the outer tube into the bed.

The hot gas may be produced by means of a burner positioned, preferably, in an upper region within the inner tube adjacent the upper region of the outer tube.

The relatively cool, compatible substance employed for this purpose may conveniently be powdered gypsum or gases recycled from the exhaust system after separation of dust, or may include both these materials. Powdered gypsum introduced into the outer tube may comprise part or all of the supply of calcium sulphate dihydrate to be calcined, which may be constituted by gypsum mineral or other source of dihydrate. Calcium sulphate or recycled gases passing down the outer tube are preheated before entering the bed, while at the same time they reduce the temperature of the gas within the hot gas tube before it in turn enters the bed. A further source of compatible material for introduction into the outer tube is recycled hemihydrate, for example derived from a dust collection system for the exhaust gases from the calcination vessel.

The invention has the particular advantage that it does not reduce the thermal efficiency of the calcination process. Moreover, since the outer tube only extends for part of the length of the hot gas tube within the bed, the substance passing through the outer tube does not encounter the high back pressure encountered by the heating gas at the lower end of the hot gas tube and therefore requires relatively little power, for example, in pumping recycled gases through the outer tube.

BRIEF DESCRIPTION OF DRAWINGS

The invention will be further described by way of example, with reference to the accompanying drawings, in which.

Figure 1:
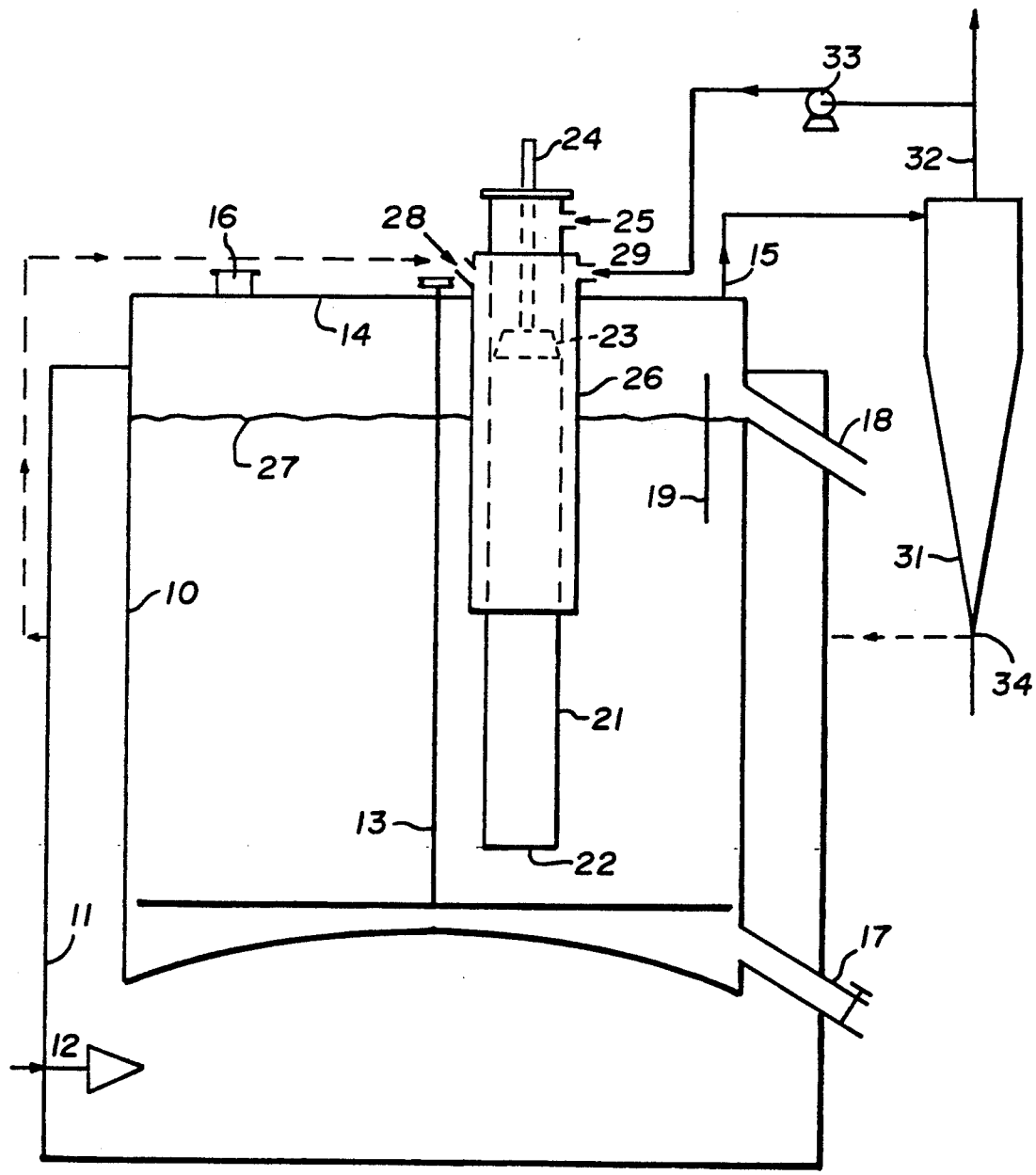
FIG. 1 is a diagrammatic vertical section of a calcination kettle with a direct-heating in hot gas tube modified in accordance with this invention.

The calcination apparatus shown in FIG. 1 comprises an externally heated steel vessel 10 surrounded by a heating jacket or chamber 11 to which heat is supplied by a burner 12. The vessel may be provided in conventional manner with a rotary stirrer 13 and with cross tubes or flues to bring the hot gases into more intimate heat exchange with the contents of the vessel, although the latter are omitted from the drawing for the sake of clarity. The vessel is fitted with a lid 14 having an opening 15 for exhaust gases and a further access opening 16 ordinarily used for the introduction of powdered gypsum. A controlled outlet 17 at the bottom of the vessel enables the contents of the vessel to be dumped, for example in batch working, and an outlet 18 at the level of the top of the bed, protected by a baffle 19, enables the kettle to be operated continuously, as described in GB 1 018 464.

The vessel is provided, in accordance with GB 1 488 665, with a heating tube 21 of steel or other heat conductive material extending downwardly into the vessel and having one or more openings at its bottom end 22 in the lower region of the vessel. Hot gases, for example hot gaseous combustion products, are either introduced at the upper end of the tube from an external source or are produced in the upper part of the tube by means of a burner 23 as shown in the drawing. With the latter arrangement, fuel is introduced through a line 24 and air for combustion purposes through a tube 25. The hot gas introduced into the bed through the tube 21 provides additional heat input over and above that conducted through the walls of the vessel from the jacket 11 and at the same time help to fluidise the material being calcined in the vessel.

In accordance with this invention, the upper part of the tube 21 is surrounded by an outer tube 26, which extends along part only of the length of the tube 21 and terminates below the top 27 of the bed of material in the vessel but at a substantial distance above the opening at the bottom 22 of the hot gas tube. The outer tube conveniently extends through the lid 14 of the vessel, as shown in the drawing, and may be provided with inlets for solid material 28 or inlets for gaseous material 29 or both.

It is preferable that the burner 23 be mounted within the inner tube 21 in a position just below the lid 14 of the vessel.

The exhaust gas outlet 15 is connected to a cyclone dust separator 31 from which a duct 32 leads to a final dust collector and subsequent discharge of the exhaust gas. If cool exhaust gases are to be recycled to the outer tube 26, they are conveniently taken from the duct 32 and pumped by a fan 33 to the gas inlet 29, as shown in the drawing. Finely divided calcined material is recovered at the base 34 of the cyclone 31 and, if desired, may be recycled to the solids inlet 28, as shown by a broken line.

Figure 2:
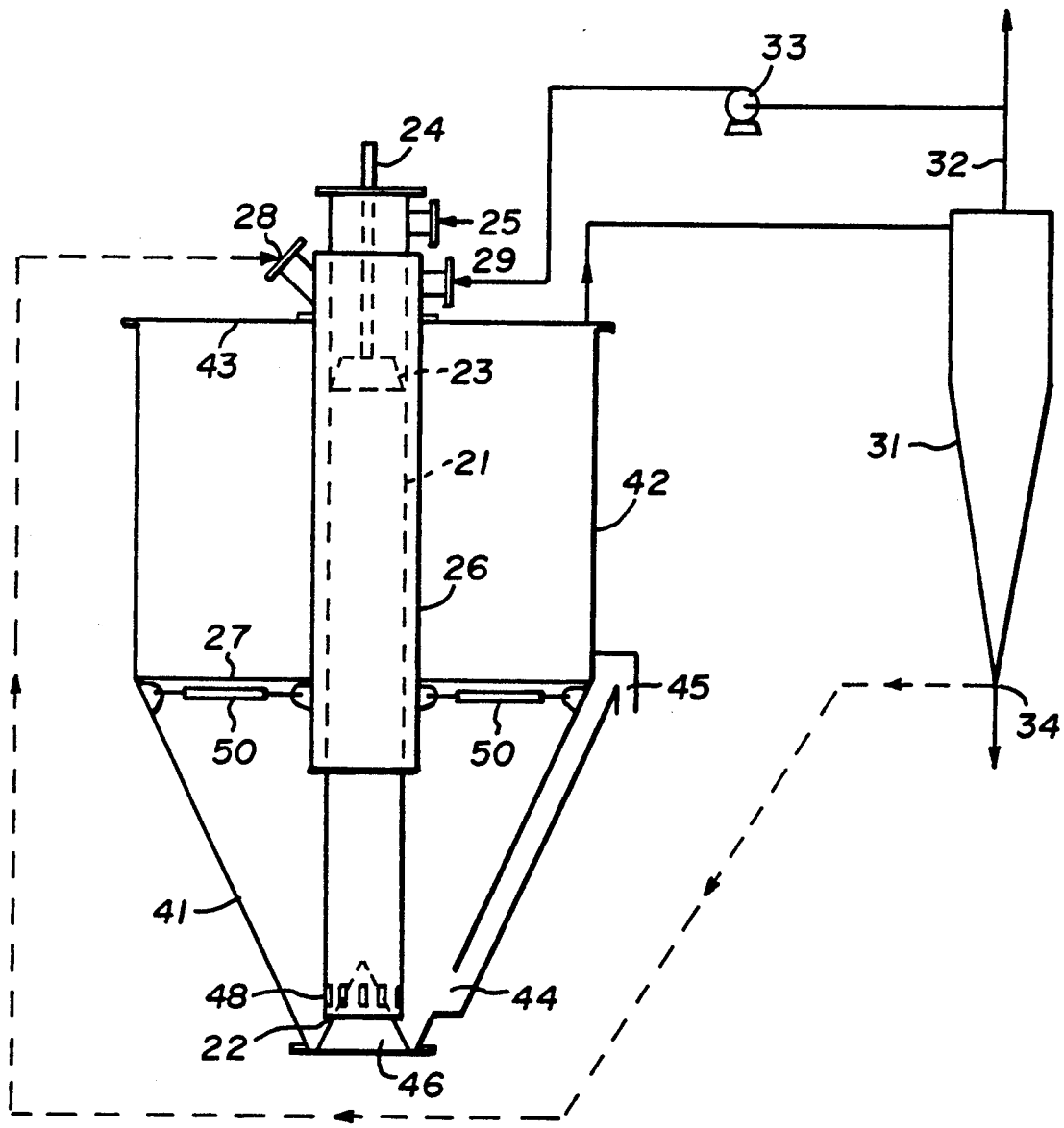
FIG. 2 is a similar view of a different form of calcination vessel including a similar modification.

In FIG. 2, items corresponding to those shown in FIG. 1 are represented by the same reference numerals. The calcination vessel, however, is of the type described in GB 2 043 219 and has an inverted frustoconical region 41 which contains the bed of material. An upper cylindrical portion 42 of the vessel extends above the level of the bed and carries a lid 43, this upper region serving principally as a release zone for solids carried up with the exhaust gases. The vessel 41 is efficiently lagged and is not externally heated, although a low level of heating may be provided in the insulation to offset any heat loss through the wall. An opening 44 near the bottom of the vessel communicates with a weir 45 which determines the level 27 of the bed in operation.

A hot gas tube 21 extends through the lid 43 of the vessel to a position near the bottom, where its open bottom 22 receives an internal protuberance 46, preferably conical, on the bottom of the vessel, which serves to improve the distribution of gases emerging from the bottom 22 of the tube. The gas tube 21 may also be provided with slots 48 in the lower region of its sidewall to further improve the distribution of gases.

The arrangement of the hot gas tube 21, the means for supplying the hot gas, the provision of an outer tube 26 and the means for introducing various substances into the outer tube are all as described in connection with FIG. 1, as are the means employed to separate dust from the exhaust gases and for recycling cool exhaust gas or recovered powdered material from the cyclone to the inlets of the outer tube. The outer tube 26 may conveniently be restrained from movement by retaining means such as springs 50.

It is preferable that the burner 23 be positioned within the inner tube 21 in a position just below the lid 43 of the vessel.

The invention will be further described by way of the following examples.

EXAMPLES

Gypsum was calcined using a gas fired calcination vessel, as described in GB 2 043 219, modified according to the present invention as shown in FIG. 2. The calcination process was operated with either exhaust gas recycle via the duct 32 and fan 33 to the gas inlet 29 or with cold mineral infeed to the solids inlet 28 or with both, as indicated in Table 1. The proportion of insoluble anhydrite present in the calcined product leaving the weir 45 and the base 34 of the cyclone 31 was determined and is also shown in Table 1.

The percentage excess air values detailed in Table 1 indicate the amount of air entering the burner tube in excess of that necessary for complete combination of the burner fuel gas, expressed as a percentage of the stoichiometric quantity required for complete combustion.

TABLE 1

| Example | Description of Calcination Conditions | Gas scfh | Air scfh | % Excess air | % insoluble anhydrite principal product (from weir) | fine product (from cyclone) |
|---|---|---|---|---|---|---|
| Control | No exhaust gas recycle or mineral injection | 700 | 14000 | 117 | 3.5 | 7.1 |
| 1 | Mineral injection | 700 | 13000 | 102 | 2.9 | 3.6 |
| 2 | Mineral injection | 600 | 13500 | 144 | 2.3 | 4.9 |
| 3 | Exhaust gas recycle | 600 | 13500 | 144 | 0.8 | 1.4 |
| 4 | Exhaust gas recycle and mineral injection | 650 | 15500 | 159 | 0.5 | 2.0 |

The subject matter claimed is:

1. A method for calcining calcium sulphate dihydrate by heating material in a bed by the direct introduction of a hot as through a tube extending downwardly into the bed, in which the temperature of the hot gas is reduced before it directly contacts the material in the bed by indirect heat exchange through the wall of the tube with at least one relatively cool substance compatible with the material of the bed, said substance or substances themselves being separate from the material of the bed during the initial heat exchange but contacting said material before the latter is contacted by the hot gas and at a higher level of the bed than does the hot gas.

2. A method according to claim 1 in which calcination is carried out continuously, and the comPatible substance comprises a continuous suPPly of fresh material to be calcined.

3. A method according to claim 1 in which the comPatible substance comPrises relatively cool exhaust gas from the bed from which dust carried out by the exhaust gas has been separated.

4. A method according to claim 2 in which the comPatible substance also comPrises relatively cool exhaust gas from the bed from which dust carried out by the exhaust gas has been separated.

5. A method according to claim 1 in which the comPatible substance comprises dust separated from the exhaust gas leaving the bed.

6. A method according to claim 2 in which the comPatible substance also comprises dust separated from the exhaust gas leaving the bed.

7. A method according to claim 3 in which the comPatible substance also comprises dust separated from the exhaust gas leaving the bed.

* * * * *